United States Patent
Zhang et al.

(10) Patent No.: US 12,219,396 B2
(45) Date of Patent: Feb. 4, 2025

(54) TRANSMISSION LATENCY MITIGATION FOR VOICE OVER NEW RADIO (VONR)

(71) Applicant: Apple Inc., Cupertino, CA (US)

(72) Inventors: Kai Zhang, Beijing (CN); Lele Cui, Beijing (CN); Deepankar Bhattacharjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 17/945,627

(22) Filed: Sep. 15, 2022

(65) Prior Publication Data

US 2024/0098571 A1  Mar. 21, 2024

(51) Int. Cl.
*H04W 28/08* (2023.01)
*H04L 47/263* (2022.01)
*H04L 47/32* (2022.01)

(52) U.S. Cl.
CPC ....... *H04W 28/0975* (2020.05); *H04L 47/263* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 10,291,541 B1 * | 5/2019 | Sung | H04L 47/32 |
| 2010/0329279 A1 * | 12/2010 | Li | H04W 8/04 370/465 |
| 2020/0059683 A1 | 2/2020 | Grigsby et al. | |
| 2021/0343304 A1 | 11/2021 | Qui et al. | |

FOREIGN PATENT DOCUMENTS

EP  3050348 B1  11/2019

* cited by examiner

*Primary Examiner* — Anh Ngoc M Nguyen
(74) *Attorney, Agent, or Firm* — Sterne, Kessler, Goldstein & Fox P.L.L.C.

(57) ABSTRACT

Systems, methods, and apparatuses disclosed herein can mitigate transmitting latency to improve the quality of a voice or the video call. These systems, methods, and apparatuses reset a transmitting latency timer upon retrieving a packet from a transmitting buffer. Thereafter, these systems, methods, and apparatuses start the count of the transmitting latency timer as the packet is being processed. And these systems, methods, and apparatuses compare the transmitting latency timer e with a transmitting latency threshold as these systems, methods, and apparatuses are processing a packet for transmission. These systems, methods, and apparatuses can drop the packet and/or can select another packet for processing in response to the transmitting latency timer exceeding the transmitting latency threshold to mitigate the transmitting latency.

20 Claims, 4 Drawing Sheets

TRANSMISSION LATENCY MITIGATION FOR VOICE OVER NEW RADIO (VONR)

BACKGROUND

Voice over New Radio (VoNR) represents a voice and video communications service that packetizes voice over the Internet Protocol (VoIP) and transports Real-time Transport Protocol (RTP) packets between a calling user equipment (UE) and a called UE. The called UE can receive the RTP packets in a different order than were sent by the calling UE, also referred to as out-of-order delivery. To compensate for the out-of-order delivery, the called UE can include a jitter buffer to reconstruct an ordering of the RTP packets provided by the calling UE. The jitter buffer can include a static jitter buffer that maintains a receiving latency timer within the called UE. Undesirable latency within the calling UE, herein referred to as transmitting latency, can cause the RTP packets to arrive at the called UE after expiration of the receiving latency timer. Because these packets arrive at the called UE after expiration of the receiving latency timer, the called UE can consider these RTP packets to be lost.

SUMMARY OF DISCLOSURE

Some embodiments of this disclosure describe a first user equipment (UE). The first UE can include a transceiver and a processor that is coupled to the transceiver. The transceiver transmits a first packet that is retrieved from a transmitting buffer to a second UE. The processor resets a transmitting latency timer in response to the transceiver transmitting the first packet to the second UE, starts a transmitting latency timer as a second packet retrieved from the transmitting buffer starts being processed by the first UE for transmission to the second UE, and compares a count of the transmitting latency timer with a transmitting latency threshold during processing of the second packet by the first UE. And in response to the count of the transmitting latency timer exceeding the transmitting latency threshold, the processor ceases the processing of the second packet by the first UE and retrieves a third packet from the transmitting buffer for processing by the first UE.

In some embodiments, the first packet, the second packet, and the third packet can include a first Real-time Transport Protocol (RTP) packet, a second RTP packet, and a third RTP packet, respectively, that are associated with a voice call or a video call between the first UE and the second UE.

In some embodiments, the processor can transmit, using the transceiver, the second packet to the second UE in response to the processing of the second packet by the first UE being completed before the count of the transmitting latency timer exceeds the transmitting latency threshold.

In some embodiments, the processing by the first UE can include Packet Data Convergence Protocol (PDCP) and radio link control (RLC), multiple access control (MAC) processing performed by the processor and physical (PHY) layer processing performed by the transceiver.

In some embodiments, the count of the transmitting latency timer measures time consumed by the first UE to prepare the second packet for transmission to the second UE. In some embodiments, the transmitting latency threshold can include a predetermined static threshold that is based on analysis of a channel latency of a wireless channel between the first UE and the second UE and a transmitting latency of the first UE.

In some embodiments, the transmitting latency threshold can include a dynamic configurable threshold that can reflect changes in a channel latency of a wireless channel between the first UE and the second UE or a transmitting latency of the first UE. In these embodiments, the processor can decrease the dynamic configurable threshold in response to the channel latency increasing and increase the dynamic configurable threshold in response to the channel latency decreasing.

Some embodiments of this disclosure describe a method performed by a first user equipment (UE). The method includes transmitting a first packet that is retrieved from a transmitting buffer to a second UE, resetting a transmitting latency timer in response to the transceiver transmitting the first packet to the second UE, starting the transmitting latency timer as a second packet retrieved from the transmitting buffer starts being processed by the first UE for transmission to the second UE, comparing a count of the transmitting latency timer with a transmitting latency threshold during processing of the second packet by the first UE, and in response to the count of the transmitting latency timer exceeding the transmitting latency threshold, ceasing the processing of the second packet by the first UE and retrieving a third packet from the transmitting buffer for processing by the first UE.

In some embodiments, the first packet, the second packet, and the third packet can include a first Real-time Transport Protocol (RTP) packet, a second RTP packet, and a third RTP packet, respectively, that are associated with a voice call or a video call between the first UE and the second UE.

In some embodiments, the method can include transmitting the second packet to the second UE in response to the processing of the second packet by the first UE being completed before the count of the transmitting latency timer exceeds the transmitting latency threshold.

In some embodiments, the processing by the first UE can include Packet Data Convergence Protocol (PDCP) and radio link control (RLC), multiple access control (MAC) processing and physical (PHY) layer processing.

In some embodiments, the count of the transmitting latency timer measures time consumed by the first UE to prepare the second packet for transmission to the second UE.

In some embodiments, the transmitting latency threshold can include a predetermined static threshold that is based on analysis of a channel latency of a wireless channel between the first UE and the second UE and a transmitting latency of the first UE.

In some embodiments, the transmitting latency threshold can include a dynamic configurable threshold that can reflect changes in a channel latency of wireless channel between the first UE and the second UE or a transmitting latency of the first UE. In these embodiments, the method can include decreasing, the dynamic configurable threshold in response to the channel latency increasing and increasing the dynamic configurable threshold in response to the channel latency decreasing.

Some embodiments of this disclosure describe a first user equipment (UE). The first UE includes a memory and a processor that execute instructions stored in the memory. The memory stores a plurality of Real-time Transport Protocol (RTP) packets that are associated with a voice call or a video call between the first UE and a second UE. The instructions, when executed by the processor, configure the processor to reset a transmitting latency timer in response to the first UE transmitting a first RTP packet from among the plurality of RTP packets to the second UE, start the transmitting latency timer as a second RTP packet from among the plurality of RTP packets starts being processed by the first UE for transmission to the second UE, compare a count of the transmitting latency timer with a transmitting latency threshold during processing of the second RTP packet by the first UE, and cease the processing of the second RTP packet by the first UE in response to the count of the transmitting latency timer exceeding the transmitting latency threshold.

In some embodiments, the instructions, when executed by the processor, further configure the processor to retrieve a third packet for processing by the first UE.

In some embodiments, the transmitting latency threshold can include a predetermined static threshold that is based on analysis of a channel latency of a wireless channel between the first UE and the second UE and a transmitting latency of the first UE.

In some embodiments, the transmitting latency threshold can include a dynamic configurable threshold that can reflect changes in a channel latency of wireless channel between the first UE and the second UE or a transmitting latency of the first UE.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1:
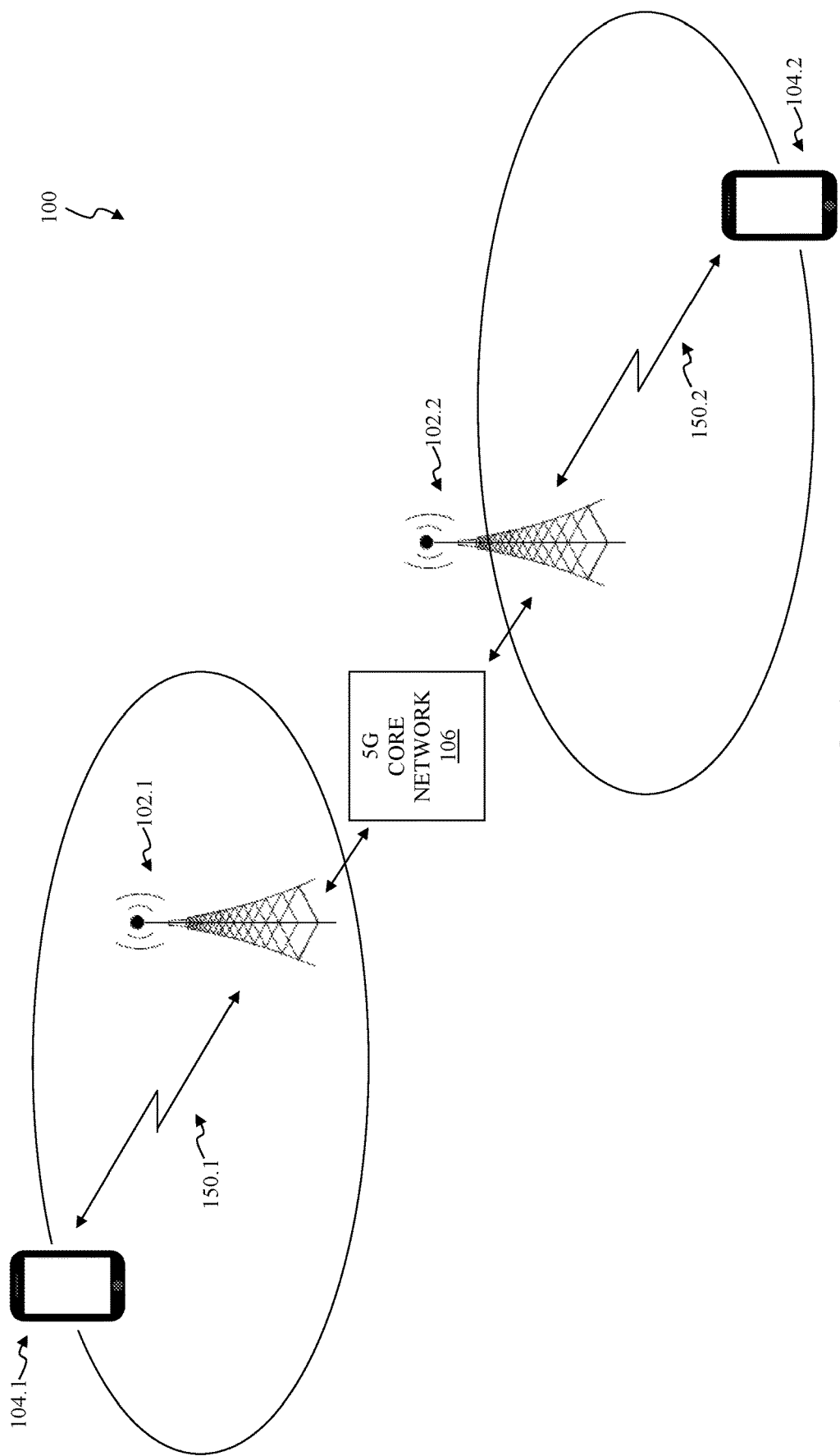
FIG. 1 graphically illustrates an exemplary wireless network for mitigating for transmitting latency in accordance with various embodiments of the present disclosure.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Systems, methods, and apparatuses disclosed herein can mitigate transmitting latency to improve the quality of a voice or the video call. These systems, methods, and apparatuses reset a transmitting latency timer upon retrieving a packet from a transmitting buffer. Thereafter, these systems, methods, and apparatuses start the count of the transmitting latency timer as the packet is being processed. And these systems, methods, and apparatuses compare the transmitting latency timer e with a transmitting latency threshold as these systems, methods, and apparatuses are processing a packet for transmission. These systems, methods, and apparatuses can drop the packet and/or can select another packet for processing in response to the transmitting latency timer exceeding the transmitting latency threshold to mitigate the transmitting latency.

In some embodiments, the aspects of this disclosure can be performed by a network and/or a user equipment (UE) that operates according to $5^{th}$ generation (5G) wireless technology for digital cellular networks as defined by 3rd Generation Partnership Project (3GPP). Additionally, or alternatively, the aspects of this disclosure can be performed by a network and/or a UE that operates according to the Release 15 (Rel-15), Release 16 (Rel-16), Release 17 (Rel-17), Rel-17 new radio (NR), or others. However, the aspects of this disclosure are not limited to these examples, and one or more mechanisms of this disclosure can be implemented by other network(s) and/or UE(s).

Exemplary Wireless Network for Mitigating for Transmitting Latency

FIG. 1 graphically illustrates an exemplary wireless network for mitigating for transmitting latency in accordance with various embodiments of the present disclosure. A wireless network 100 as illustrated in FIG. 1 is provided for the purpose of illustration only and does not limit the disclosed aspects. As illustrated in FIG. 1, the wireless network 100 may include, but is not limited to, network nodes 102.1 and 102.2, for example, base stations (BSs). The BSs can include one or more Next Generation Node BSs (gNBs), one or more radio access nodes (RANs), one or more evolved NodeBs (eNBs), one or more NodeBs, one or more Road Side Units (RSUs), one or more Transmission Reception Points (TRxPs or TRPs), and/or the like. As illustrated in FIG. 1, the wireless network 100 may also include, but is not limited to, electronic devices 104.1 and 104.2, for example, user equipments (UEs). The UEs can include one or more consumer electronics devices, one or more cellular phones, one or more smartphones, one or more feature phones, one or more tablet computers, one or more wearable computer devices, one or more personal digital assistants (PDAs), one or more pagers, one or more wireless handsets, one or more desktop computers, one or more laptop computers, one or more in-vehicle infotainments (IVIs), one or more in-car entertainment (ICEs) devices, one or more Instrument Clusters (ICs), one or more head-up display (HUD) devices, one or more onboard diagnostic (OBD) devices, one or more dashtop mobile equipments (DMEs), one or more mobile data terminals (MOTs), one or more Electronic Engine Management Systems (EEMSs), one or more electronic/engine control units (ECUs), one or more electronic/engine control modules (ECMs), one or more embedded systems, one or more microcontrollers, one or more control modules, one or more engine management systems (EMSs), one or more networked or "smart" appliances, one or more Machine-Type-Communication (MTC) devices, one or more Machine-to-Machine (M2M) devices, one or more Internet of Things (IoT) devices, and the like. The electronic devices 104.1 and 104.2, hereinafter referred to as UEs 104.1 and 104.2, can be configured to operate based on a wide variety of wireless communication techniques. These techniques can include, but are not limited to, techniques based on 3rd Generation Partnership Project (3GPP) standards. For example, the UEs 104.1 and 104.2 can be configured to operate using Rel-15, Rel-16, Rel-17, or others. The network nodes 102.1 and 102.2, herein referred to as a base station 102 or a cell 102, can include one or more nodes configured to operate based on a wide variety of wireless communication techniques such as, but not limited to, techniques based on 3GPP standards. For example, the base station 102 can include one or more nodes configured to operate using Rel-15, Rel-16, Rel-17, or others.

As illustrated in FIG. 1, UE 104.1 and the UE 104.2 can be connected to and can communicate with the base station 102.1 over a radio link 150.1 and the base station 102.2 over a radio link 150.2, respectively. The radio link 150.1 and the radio link 150.2 can include one or more downlink communication channels, for example, a Physical Downlink Control Channel (PDCCH) and/or a Physical Downlink Shared Channel (PDSCH), and/or one or more uplink communication channels, for example, a Physical Uplink Control Channel (PUCCH) and/or a Physical Uplink Shared Channel (PUSCH). The PDCCH and the PUCCH represent downlink and uplink control channels, respectively, that carry control information between the UE 104.1 and the UE 104.2 and the base station 102.1 and the base station 102.2, respectively. And the PDSCH and the PUSCH represent downlink and uplink channels, respectively, that carry data information between the UE 104.1 and the UE 104.2 and the base station 102.1 and the base station 102.2, respectively. As used herein, the terms downlink, DL, or the like refer to the direction from the base station 102.1 and the base station 102.2 to the UE 104.1 and the UE 104.2, respectively. The term uplink, UL, or the like refer to the direction from the UE 104.1 and the UE 104.2 to the base station 102.1 and the base station 102.2, respectively Voice over New Radio (VoNR) represents a voice and video communications service that packetizes voice over the Internet Protocol (VoIP) and transports Real-time Transport Protocol (RTP) packets between a calling UE and a called UE, such as the UE 104.1 and the UE 104.2, respectively, to provide an example. The RTP defines a standard packet format for delivering voice and video in real-time. For example, the RTP can be used to insert time markers and sequence numbers into the RTP packets, to control the destination arrival of the RTP packets, and/or to identify the type of information transported by the RTP packets to provide some examples. When the calling UE initiates a voice or video call, a first Radio Resource Control (RRC) connection is established between the calling UE and the base station 102.1. Thereafter, the 5G core network (5GC) 106 establishes a first quality of service (QoS) flow for the calling UE to carry Session Initiation Protocol (SIP) signaling. And the base station 102.1 establishes a first data radio bearer (DRB) between the calling UE and the base station 102.1. When the calling UE initiates a voice or video call, a second RRC connection is established between the called UE and the base station 102.2. Thereafter, the 5GC 106 establishes a second QoS flow for the called UE to carry SIP signaling. And the base station 102.2 establishes a second DRB between the called UE and the base station 102.2. Once the first DRB and the second DRB have been established, the calling UE, the called UE, and an IP Multimedia System (IMS) core associated with the 5GC 106 perform SIP negotiation on various parameters for the voice or video call, such as the codec scheme, IP address, port number, information of the calling UE and/or the called UE, and/or other voice service information for the voice or the video call to provide some examples. After SIP negotiation is successful, the 5GC 106 establishes a third QoS flow and a fourth QoS flow for the calling UE and the called UE, respectively, to transport the RTP packets between the calling UE and the called UE. And the base stations 102.1 and 102.2 establish a third DRB between the called UE and the base station 102.2 and a fourth DRB between the called UE and the base station 102.2, respectively, for the RTP packets.

In the exemplary embodiment illustrated in FIG. 1, the calling UE can transmit the RTP packets to the called UE to provide a single direction of a bi-directional voice or video call between one or more users at the calling UE and one or more users at the called UE. Similarly, the called UE can transmit RTP packets to the calling UE to provide the bi-directional voice or video call. The discussion to follow is to be described in terms of the calling UE transmitting the RTP packets to the called UE to provide the single direction of the bi-directional voice or video call for simplicity. However, those skilled in the relevant art(s) will recognize that the teachings therein are equally applicable to the called UE transmitting the RTP packets to the calling UE to provide the bi-directional voice or video call without departing from the spirt and scope of the present disclosure.

The calling UE can provide the RTP packets at predetermined, regular intervals, for example, every twenty (20) milliseconds (ms), every thirty (30) ms, every forty (40) ms, every sixty (60) ms, and the like, to the called UE. In some embodiments, the called UE can receive the RTP packets in a different order than were sent by the calling UE, also referred to as out-of-order delivery. This out-of-order delivery can be caused by, for example, channel latency, such as the RTP packets following multiple paths through the wireless network 100. To compensate for the out-of-order delivery, the called UE can include a jitter buffer to reconstruct an ordering of the RTP packets provided by the calling UE. The jitter buffer can include a static jitter buffer that maintains a receiving latency timer within the called UE. The receiving latency timer can count up to a predetermined, fixed amount of time, for example, ninety (90) ms, to measure a time elapsed between adjacent RTP packets from among the RTP packets arriving at the called UE. The called UE can reset the receiving latency timer upon a first RTP packet from among the RTP packets arriving at the called UE. Upon resetting the receiving latency timer, the called UE can measure the time elapsed between the first RTP packet arriving at the called UE and a second RTP packet from among the RTP packets arriving at the called UE. The called UE can recover the second RTP packet when the second RTP packet arrives at the called UE prior to expiration of the receiving latency timer. Alternatively, or in addition to, the called UE can consider the second RTP packet to be lost when the RTP packet has not yet arrived at the called UE upon expiration of the receiving latency timer.

Undesirable latency within the calling UE, herein referred to as transmitting latency, can cause the RTP packets to arrive at the called UE after expiration of the receiving latency timer. Because these packets arrive at the called UE after expiration of the receiving latency timer, the called UE can consider these RTP packets to be lost. The transmitting latency can be caused by, for example, and/or by lower-layer transmission procedures, such as Packet Data Convergence Protocol (PDCP), radio link control (RLC), multiple access control (MAC), and/or physical (PHY) layer to provide some examples. In some embodiments, the PDCP, and the RLC, the MAC represents layer 2 processing that can be performed by a processor, such as the processor 210 as to be described in further detail below in FIG. 2. And the PHY layer represents layer 1 processing that can be performed by a transceiver, such as the transceiver 220 as to be described in further detail below in FIG. 2.

As to be described in further detail below, the calling UE can mitigate this transmitting latency to improve the quality of the voice or the video call. During operation, the calling UE can store the RTP packets that are pending transmission to the called UE in a transmission buffer. The calling UE can process these RTP packets in accordance with the lower-layer transmission procedures to prepare these packets for transmission to the called UE. The calling UE can maintain a transmitting latency timer that measures the time elapsed between adjacent RTP packets from among the RTP packets that are retrieved from the transmission buffer and transmitted to the called UE. In some embodiments, the transmitting latency timer measures the time consumed by the lower-layer transmission procedures to prepare a RTP packet from among the RTP packets that is retrieved from the transmission buffer for transmission to the called UE. For example, the transmitting latency timer measures the time elapsed between completing a transmission of a first RTP packet from among the adjacent RTP packets and the time consumed by the lower-layer transmission procedures to prepare a second RTP packet from among the adjacent RTP packets for transmission to the called UE. In this example, the transmitting latency timer can be reset upon completing the transmission of the first RTP packet to measure the time consumed by the lower-layer transmission procedures to prepare the second RTP packet to the called UE. In some embodiments, the first RTP packet can be segmented into multiple RTP packet segments. In these embodiments, the transmitting latency timer can be reset upon completing the transmission of the multiple RTP packet segments.

The calling UE can compare the count of the transmitting latency timer with a transmitting latency threshold as the calling UE is preparing the RTP packet for transmission to the called UE. The calling UE can compare the count of the transmitting latency timer with the transmitting latency threshold as the calling UE is processing the RTP packet in accordance with the lower-layer transmission procedures. Generally, the transmitting latency threshold can be selected such that the a combination of the channel latency and the transmitting latency does not exceed the receiving latency timer at the called UE. The transmitting latency threshold can represent a predetermined static threshold that can be based on analysis of the channel latency and/or the transmitting latency or a dynamic configurable threshold that can reflect changes in the channel latency and/or the transmitting latency. In these embodiments, the transmitting latency threshold can be inversely related to the channel latency. For example, the transmitting latency threshold can be decreased to allow for less time to process the RTP packet in accordance with the lower-layer transmission procedures in response to the channel latency increasing. As another example, the transmitting latency threshold can be increased to allow for more time to process the RTP packet in accordance with the lower-layer transmission procedures in response to the channel latency decreasing.

The calling UE can complete processing of the RTP packet in accordance with the lower-layer transmission procedures before the count of the transmitting latency timer exceeds the transmitting latency threshold. After processing of the RTP packet before the count of the transmitting latency timer exceeds the transmitting latency threshold, the calling UE can transmit the RTP packet to the called UE. Alternatively, or in addition to, the calling UE can cease processing of the RTP packet in response to the count of the transmitting latency timer exceeding the transmitting latency threshold. In some embodiments, the calling UE can drop the RTP packet being processed in response to the count of the transmitting latency timer exceeding the transmitting latency threshold and can reserve resources allocated to the transmission of the RTP packet for another RTP packet stored in the transmission buffer. In these embodiments, the calling UE can select the other RTP packet from the transmission buffer to be processed in accordance with the lower-layer transmission procedures in response to the count of the transmitting latency timer exceeding the transmitting latency threshold. Additionally, the calling UE can reset the transmitting latency timer upon selecting the other RTP packet from the transmission buffer. In some embodiments, the calling UE can select a newest RTP packet that is stored in the transmission buffer, namely, Last In, First Out, as the other RTP packet. In some embodiments, the transmitting latency timer can be extended to multiple RTP packets stored within the transmission buffer such that:

$$T_{lat}[X+n]=T_{lat}[X]-20*n \text{ ms}, \qquad (1)$$

where $T_{lat}[X+n]$ represents the count of the transmitting latency timer for an RTP packet [X+n] that is stored within the transmission buffer and $T_{lat}[X]$ represents the count of the transmitting latency timer for an RTP packet [X] that is stored within the transmission buffer. In these embodiments, the calling UE can select the other RTP packet as being a packet that is stored within the transmission buffer having the count of the transmitting latency timer that does not exceed the transmitting latency threshold.

Figure 2:
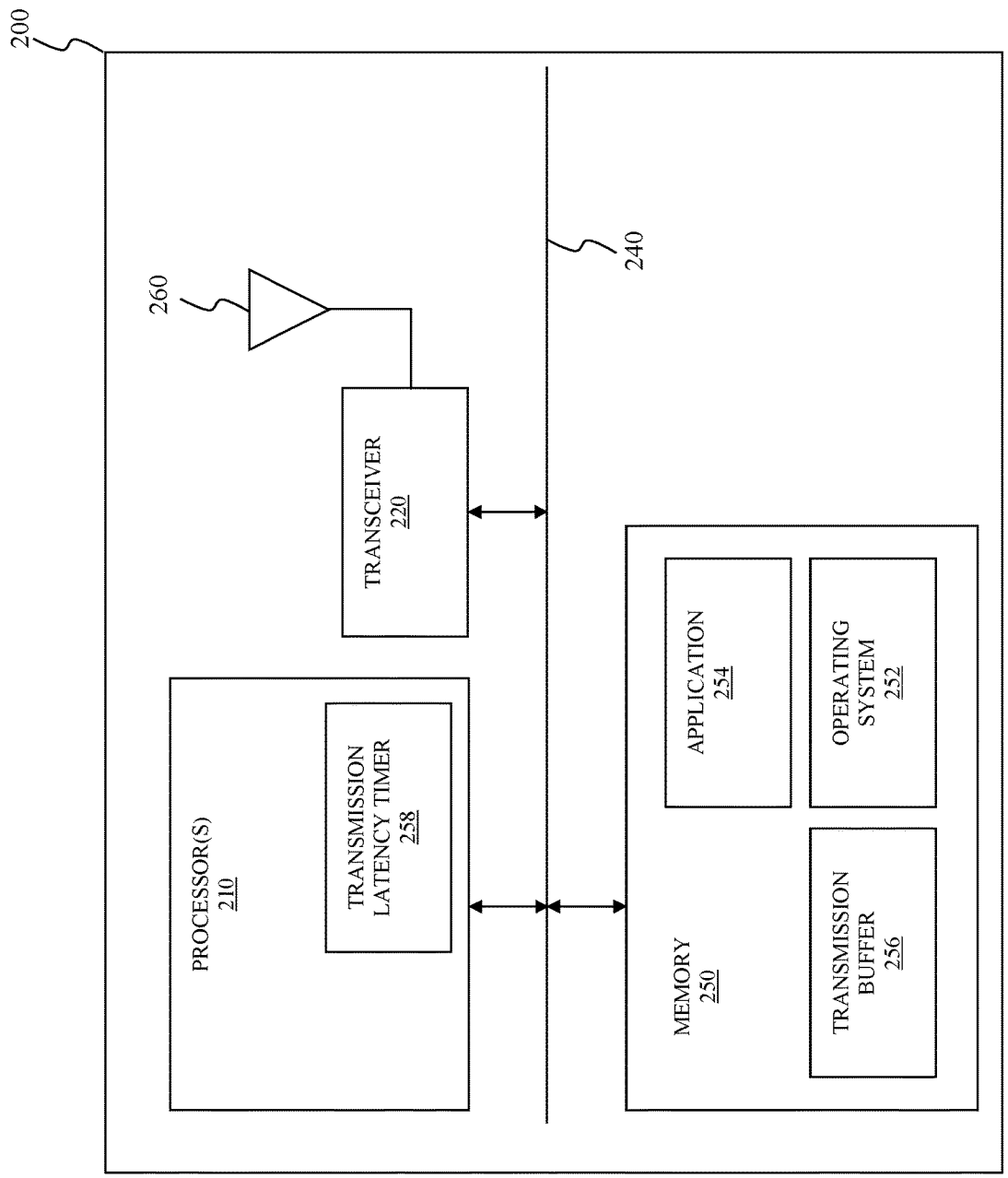
FIG. 2 illustrates a block diagram of an electronic device for mitigating for the transmitting latency according to some aspects of the disclosure.

Exemplary Electronic Device that can be Implemented within the Exemplary Wireless Network FIG. 2 illustrates a block diagram of an electronic device for mitigating for the transmitting latency according to some aspects of the disclosure. In the exemplary embodiment illustrated in FIG. 2, an electronic device 200 may be any of the electronic devices, for example, the UEs 104.1 and 104.2 of the wireless network 100 as described above in FIG. 1. As illustrated in FIG. 2, the electronic device includes one or more processors 210, one or more transceivers 220, a communication infrastructure 240, a memory 250, an operating system 252, an application 254, a transmission buffer 256, a transmitting latency timer 258, and an antenna 260. The various systems illustrated in FIG. 2 are provided as exemplary parts of the electronic device 200, and the electronic device 200 can include other circuit(s) and subsystem(s). Also, although the systems of the electronic device 200 are illustrated as separate components, the aspects of this disclosure can include any combination of these, less, or more components. Also, the electronic device 200 can include any number of processors, transceivers, communication infrastructures, memories, operating systems, applications, and antennas.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 can be stored in the memory 250. The operating system 252 can manage transfer of data between the memory 250, the application 254, the processor 210, and/or the transceiver 220. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer. In some embodiments, the application 254 can be stored in the memory 250. The application 254 can include applications (e.g., user applications) used by a wireless electronic device and/or a user of the wireless electronic device. The application 254 can include applications such as, but not limited to, radio streaming, video streaming, remote control, and/or other user applications. In some embodiments, the transmission buffer 256 can store the RTP packets for transmission to the UEs 104.1 and 104.2 to provide an example as described above in FIG. 1.

The electronic device 200 can also include the communication infrastructure 240. The communication infrastructure 240 provides communication between, for example, the processor 210, the transceiver 220, and the memory 250. In some implementations, the communication infrastructure 240 may be a bus. The processor 210 together with instructions stored in memory 250 can performs operations enabling the electronic device 200 to mitigate for transmitting latency within the UEs 104.1 and 104.2 to provide an example to improve the quality of a voice or the video call between the UEs 104.1 and 104.2 as described herein. Alternatively, the processor 210 can be "hard-coded" to perform operations enabling the electronic device 200 to mitigate for transmitting latency within the UEs 104.1 and 104.2 to provide an example to improve the quality of a voice or the video call between the UEs 104.1 and 104.2 as described herein.

The transceiver 220 can transmit and receive communications signals that support the operations of electronic device including, but not limited to, mitigation for transmitting latency, according to some aspects, and may be coupled to the antenna 260. The antenna 260 may include one or more antennas that may be the same or different types. The transceiver 220 allows the electronic device 200 to communicate with other devices that may be wired and/or wireless. In some examples, the transceiver 220 can include processors, controllers, radios, sockets, plugs, buffers, and like circuits/devices used for connecting to and communication on networks. According to some examples, the transceiver 220 include one or more circuits to connect to and communicate on wired and/or wireless networks. In some embodiments, the transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, the transceiver 220 can include more or fewer systems for communicating with other devices. In some embodiments, the transceiver 220 can include one or more circuits (including a WLAN transceiver) to enable connection(s) and communication over WLAN networks such as, but not limited to, networks based on standards described in IEEE 802.11. Additionally, or alternatively, the transceiver 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver. In some embodiments, the transceiver 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the transceiver 220a-220n can be configured to operate according to one or more of Rel-15, Rel-16, Rel-17, or other of the 3GPP standards.

In some embodiments, the processor 210, alone or in combination with computer instructions stored within the memory 250, and/or the transceiver 220 can mitigate for transmitting latency within the UEs 104.1 and 104.2 to provide an example to improve the quality of a voice or the video call between the UEs 104.1 and 104.2 as described herein.

Exemplary Operation of the Exemplary UE

Figure 3:
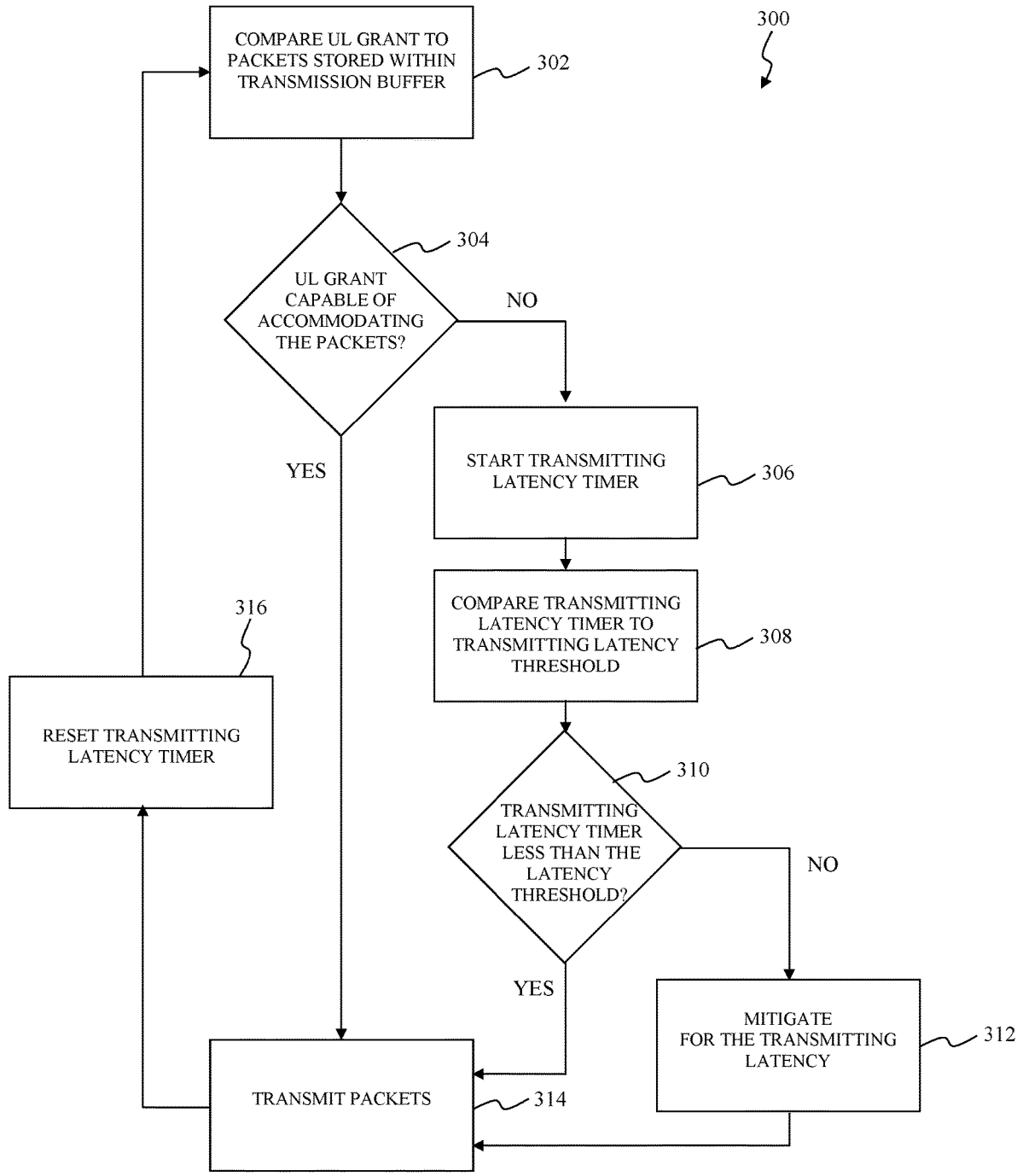
FIG. 3 illustrates a flowchart of an exemplary operation for mitigating for transmitting latency in accordance with various embodiments of the present disclosure.

FIG. 3 illustrates a flowchart of an exemplary operation for mitigating for transmitting latency in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for mitigating for the transmitting latency within an electronic device, such as the UE 104.1 and/or the UE 104.2 to provide an example, to improve the quality of a voice or the video call between the electronic device and another electronic device. The operational control flow 300 can be executed by a computing system, such as the UEs 104.1 and 104.2 as described above in FIG. 1, the electronic device 200 as described above in FIG. 2 (e.g. processor 210), and/or the computer system 500 as to be described in further detail below in FIG. 5. In the discussion of FIG. 3, the first UE can be the "calling UE" and the second UE can be the "called UE" consistent with the discussion above. Alternatively, the second UE can be the "calling UE" and the first UE can be the "called UE."

At operation 302, a first UE compares an uplink (UL) grant with packets that are stored within a transmission buffer (e.g. buffer 256) of the electronic device. In some embodiments, the packets are Real-time Transport Protocol (RTP) packets that are associated with a voice or video call. In some embodiments, the operational control flow 300 can undergo a handshaking process to schedule the UL grant. As part of this handshaking process, the operational control flow 300 can request the UL grant by sending a scheduling request message over the PUCCH to a base station, such as the base station 102.1 or the base station 102.2. And the base station, in response to the scheduling request message, can reply to the operational control flow 300 with the UL grant using, for example, Downlink Control Information (DCI) format 0_0 messages or DCI format 0_1 messages that are sent over the PDCCH. Alternatively, or in addition to, the operational control flow 300 can perform a grant-free access to schedule the UL grant without the handshaking process. In this alternative, or addition, the UL grant can be pre-configured and assigned to the operational control flow 300 without waiting for the operational control flow 300 to specifically request the UL grant.

At operation 304, the first UE determines whether the UL grant is capable of accommodating the packet stored in the transmission buffer. If so, the first UE proceeds to operation 314 when the UL grant from operation 302 is capable of accommodating the packets from operation 302. In this situation, the UL grant from operation 302 is sufficient to transmit the packets that are stored within the transmission buffer from operation 304. Otherwise, the first UE proceeds to operation 306 when the UL grant from operation 302 is not capable of accommodating the packets from operation 302. In this situation, the UL grant from operation 302 is insufficient to transmit all the packets that are stored within the transmission buffer from operation 304. As a result, the first UE can piecewise transmit the packets that are stored within the transmission buffer from operation 304 using multiple UL grants.

At operation 306, the first UE starts a transmitting latency timer, for example, transmitting latency timer 258 as described above in FIG. 2. The first UE can select a packet from among the packets from operation 302 that are stored within the transmission buffer. In some embodiments, the operational control flow 300 can start the transmitting latency timer upon retrieving the packet from the transmission buffer. Thereafter, the operational control flow 300 can process the RTP packet in accordance with the lower-layer transmission procedures to prepare this packet for transmission to a second UE. Herein, the count of the transmitting latency timer is a measure of the time consumed by the first UE to prepare the packet for transmission to the second UE.

At operation 308, the first UE compares a count of the transmitting latency timer from operation 306 with a transmitting latency threshold. The operational control flow 300 can compare the count of the transmitting latency timer from operation 306 with the transmitting latency threshold as the first UE is preparing the RTP packet for transmission to the second UE. The operational control flow 300 can compare the count of the transmitting latency timer from operation 306 with the transmitting latency threshold as the operational control flow 300 is processing the RTP packet in accordance with the lower-layer transmission procedures.

At operation 310, the first UE determines whether the transmitting latency timer from operation 306 is less than the transmitting latency timer threshold from operation 308. The first UE proceeds to operation 314 when the transmitting latency timer from operation 306 from operation 308 is less than the transmitting latency threshold from operation 314. In this situation, the operational control flow 300 can complete processing of the packet from operation 308 in accordance with the lower-layer transmission procedures before the count of the transmitting latency timer from operation 306 exceeds the transmitting latency threshold. After processing of the packet from operation 308 before the count of the transmitting latency timer from operation 306 exceeds the transmitting latency threshold, the operational control flow 300 proceeds to operation 314 to transmit the RTP packet to the other electronic device. Otherwise, the operational control flow 300 proceeds to operation 312 when the transmitting latency timer from operation 306 from operation 314 is greater than or equal to the transmitting latency threshold from operation 308. In this situation, the operational control flow 300 cannot complete processing of the packet from operation 308 in accordance with the lower-layer transmission procedures before the count of the transmitting latency timer from operation 306 exceeds the transmitting latency threshold. As such, the operation control flow 300 proceeds to operation 312 to mitigate the transmitting latency within the electronic device.

At operation 312, the first UE mitigates for the transmitting latency. In some embodiments, the first UE can cease processing of the packet from operation 308 in response to the count of the transmitting latency timer from operation 306 exceeding the transmitting latency threshold at operation 308. In some embodiments, the first UE can drop the packet from operation 308 being processed in response to the count of the transmitting latency timer from operation 306 exceeding the transmitting latency threshold at operation 310. In some embodiments, the first UE can reserve resources allocated to the transmission of the packet from operation 308 for another packet from among the packets from operation 302 that are stored within the transmission buffer. In these embodiments, the first UE can select the other packet from the transmission buffer to be processed in accordance with the lower-layer transmission procedures in response to the count of the transmitting latency timer from operation 306 exceeding the transmitting latency threshold at operation 308.

At operation 314, the first UE transmits the packets from operation 302, the packet from operation 308, and/or the packet from operation 310 to the second UE. In some embodiments, the operational control flow 300 transmits the packets from operation 302, the packet from operation 308, and/or the packet from operation 310 over the PUSCH the other electronic device in accordance with the UL grant from operation 302.

At operation 316, the first UE resets the transmitting latency timer from operation 306 from operation 306. The first UE transmitting latency timer can be reset upon completing the transmission of the packets from operation 302. In some embodiments, the packets from operation 302 can be segmented into multiple packet segments. In these embodiments, the transmitting latency timer can be reset upon completing the transmission of the multiple packet segments.

Figure 4:
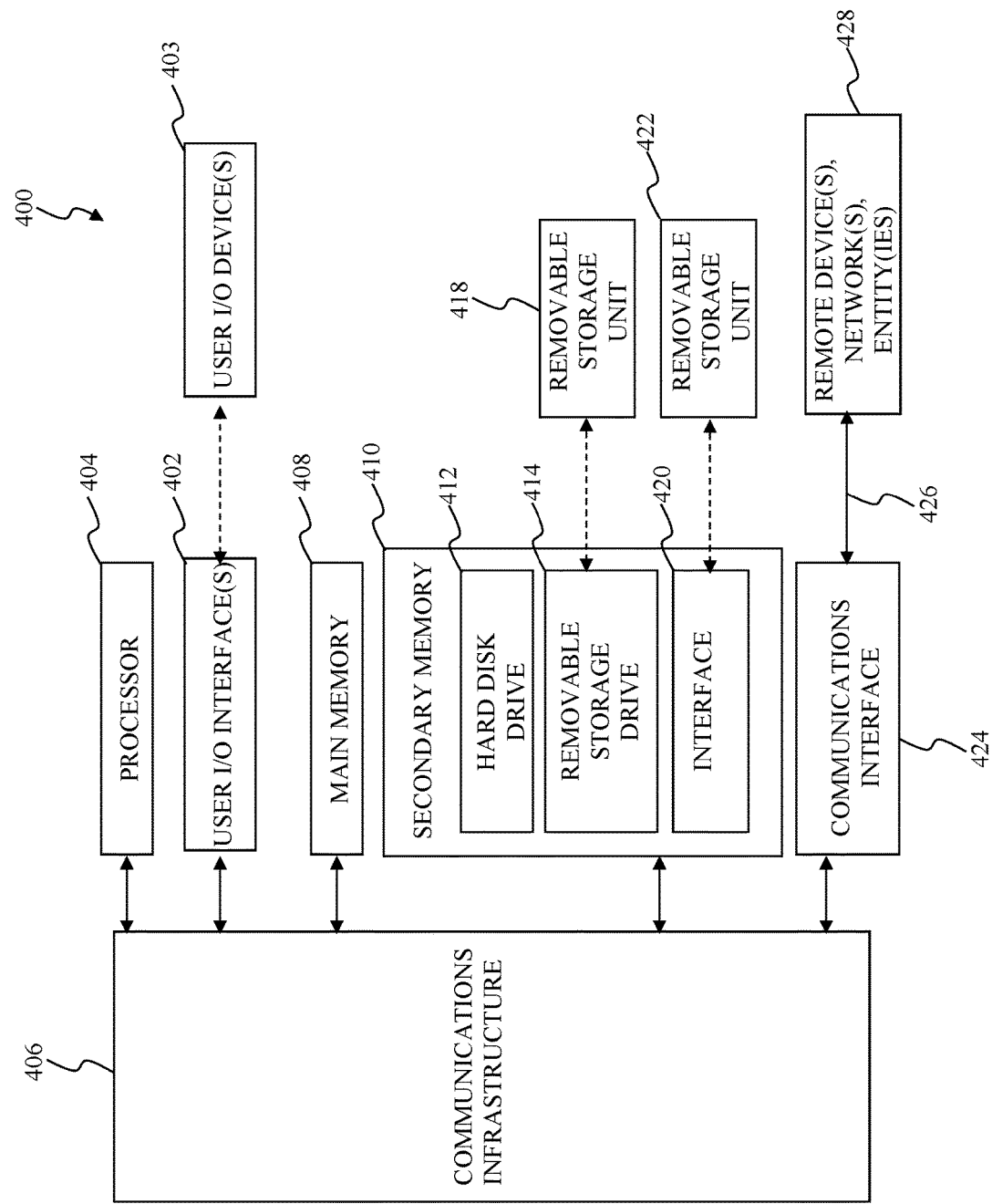
FIG. 4 illustrates a block diagram of an exemplary computer system that can be implemented within the exemplary wireless network according to some exemplary embodiments of the present disclosure.

Exemplary Computer System that can be Implemented within the Exemplary Wireless Network FIG. 4 illustrates a block diagram of an exemplary computer system that can be implemented within the exemplary wireless network according to some exemplary embodiments of the present disclosure. Computer system 400 can be any well-known computer capable of performing the functions described herein such as devices 102.1 and 102.2 of FIG. 1, and/or 200 of FIG. 2. Computer system 400 includes one or more processors (also called central processing units, or CPUs), such as a processor 404. Processor 404 is connected to a communication infrastructure 406 (e.g., a bus). Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some aspects, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 4. In particular, aspects may operate with software, hardware, and/or operating system implementations other than those described herein.

CONCLUSION

Embodiments of the disclosure can be implemented in hardware, firmware, software application, or any combination thereof. Embodiments of the disclosure can also be implemented as instructions stored on one or more computer-readable mediums, which can be read and executed by one or more processors. A computer-readable medium can include any mechanism for storing or transmitting information in a form readable by a computer (e.g., a computing circuitry). For example, a computer-readable medium can include non-transitory computer-readable mediums such as read only memory (ROM); random access memory (RAM); magnetic disk storage media; optical storage media; flash memory devices; and others. As another example, the computer-readable medium can include transitory computer-readable medium such as electrical, optical, acoustical, or other forms of propagated signals (e.g., carrier waves, infrared signals, digital signals, etc.). Further, firmware, software application, routines, instructions have been described as performing certain actions. However, it should be appreciated that such descriptions are merely for convenience and that such actions in fact result from computing devices, processors, controllers, or other devices executing the firmware, software application, routines, instructions, etc.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan considering the teachings and guidance.

The breadth and scope of the disclosure should not be limited by any of the above-described exemplary embodiments but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A first user equipment (UE), comprising:
a transceiver configured to transmit a first packet that is retrieved from a transmitting buffer to a second UE; and
a processor, coupled to the transceiver, configured to:
reset a transmitting latency timer in response to the transceiver transmitting the first packet to the second UE,
start the transmitting latency timer as a second packet retrieved from the transmitting buffer starts being processed by the first UE for transmission to the second UE,
compare a count of the transmitting latency timer with a transmitting latency threshold during processing of the second packet by the first UE, and
in response to the count of the transmitting latency timer exceeding the transmitting latency threshold, cease the processing of the second packet by the first UE, and
retrieve a third packet from the transmitting buffer for processing by the first UE.

2. The first UE of claim 1, wherein the first packet, the second packet, and the third packet comprise a first Real-time Transport Protocol (RTP) packet, a second RTP packet, and a third RTP packet, respectively, that are associated with a voice call or a video call between the first UE and the second UE.

3. The first UE of claim 1, wherein the processor is further configured to transmit, using the transceiver, the second packet to the second UE in response to the processing of the second packet by the first UE being completed before the count of the transmitting latency timer exceeds the transmitting latency threshold.

4. The first UE of claim 1, wherein the processing by the first UE comprises:
Packet Data Convergence Protocol (PDCP) and radio link control (RLC), multiple access control (MAC) processing performed by the processor; and
physical (PHY) layer processing performed by the transceiver.

5. The first UE of claim 1, wherein the count of the transmitting latency timer is configured to measure time consumed by the first UE to prepare the second packet for transmission to the second UE.

6. The first UE of claim 1, wherein the transmitting latency threshold comprises:
a predetermined static threshold that is based on analysis of a channel latency of a wireless channel between the first UE and the second UE and a transmitting latency of the first UE.

7. The first UE of claim 1, wherein the transmitting latency threshold comprises:
a dynamic configurable threshold that reflects changes in a channel latency of a wireless channel between the first UE and the second UE or a transmitting latency of the first UE.

8. The first UE of claim 7, wherein the processor is further configured to:
decrease the dynamic configurable threshold in response to the channel latency increasing; and
increase the dynamic configurable threshold in response to the channel latency decreasing.

9. A method performed by a first user equipment (UE), the method comprising:
transmitting a first packet that is retrieved from a transmitting buffer to a second UE;
resetting a transmitting latency timer in response to a transceiver transmitting the first packet to the second UE;
starting the transmitting latency timer as a second packet retrieved from the transmitting buffer starts being processed by the first UE for transmission to the second UE;
comparing a count of the transmitting latency timer with a transmitting latency threshold during processing of the second packet by the first UE; and
in response to the count of the transmitting latency timer exceeding the transmitting latency threshold, ceasing the processing of the second packet by the first UE, and
retrieving a third packet from the transmitting buffer for processing by the first UE.

10. The method of claim 9, wherein the first packet, the second packet, and the third packet comprise a first Real-time Transport Protocol (RTP) packet, a second RTP packet, and a third RTP packet, respectively, that are associated with a voice call or a video call between the first UE and the second UE.

11. The method of claim 9, further comprising transmitting the second packet to the second UE in response to the processing of the second packet by the first UE being completed before the count of the transmitting latency timer exceeds the transmitting latency threshold.

12. The method of claim 9, wherein the processing by the first UE comprises:
Packet Data Convergence Protocol (PDCP) and radio link control (RLC), multiple access control (MAC) processing; and
physical (PHY) layer processing.

13. The method of claim 9, wherein the count of the transmitting latency timer measures time consumed by the first UE to prepare the second packet for transmission to the second UE.

14. The method of claim 9, wherein the transmitting latency threshold comprises a predetermined static threshold that is based on analysis of a channel latency of a wireless channel between the first UE and the second UE and a transmitting latency of the first UE.

15. The method of claim 9, wherein the transmitting latency threshold comprises a dynamic configurable threshold that reflects changes in a channel latency of a wireless channel between the first UE and the second UE or a transmitting latency of the first UE.

16. The method of claim 15, further comprising:
decreasing the dynamic configurable threshold in response to the channel latency increasing; and
increasing the dynamic configurable threshold in response to the channel latency decreasing.

17. A first user equipment (UE), comprising:
a memory that stores a plurality of Real-time Transport Protocol (RTP) packets that are associated with a voice call or a video call between the first UE and a second UE; and
a processor configured to execute instructions stored in the memory, the instructions, when executed by the processor, configuring the processor to:
reset a transmitting latency timer in response to the first UE transmitting a first RTP packet from among the plurality of RTP packets to the second UE,
start the transmitting latency timer as a second RTP packet from among the plurality of RTP packets starts being processed by the first UE for transmission to the second UE, compare a count of the transmitting latency timer with a transmitting latency threshold during processing of the second RTP packet by the first UE, and cease the processing of the second RTP packet by the first UE in response to the count of the transmitting latency timer exceeding the transmitting latency threshold.

18. The first UE of claim 17, wherein the instructions, when executed by the processor, further configure the processor to retrieve a third packet for processing by the first UE.

19. The first UE of claim 17, wherein the transmitting latency threshold comprises a predetermined static threshold that is based on analysis of a channel latency of a wireless channel between the first UE and the second UE and a transmitting latency of the first UE.

20. The first UE of claim 17, wherein the transmitting latency threshold comprises a dynamic configurable threshold that reflects changes in a channel latency or a transmitting latency.

* * * * *